Nov. 28, 1950 — M. A. NOLAN — 2,532,186
FISH TRAP WITH EXPANDIBLE HOOKS
Filed Oct. 24, 1949
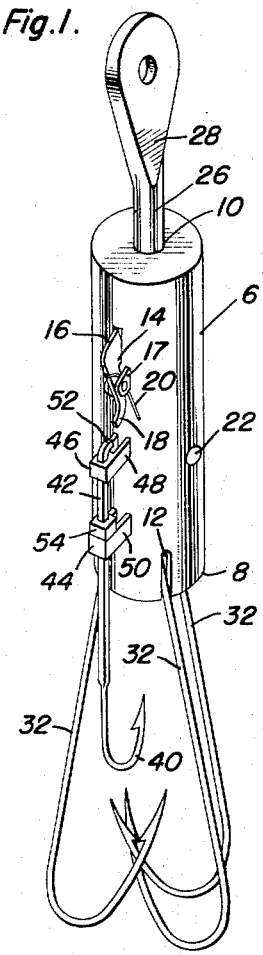
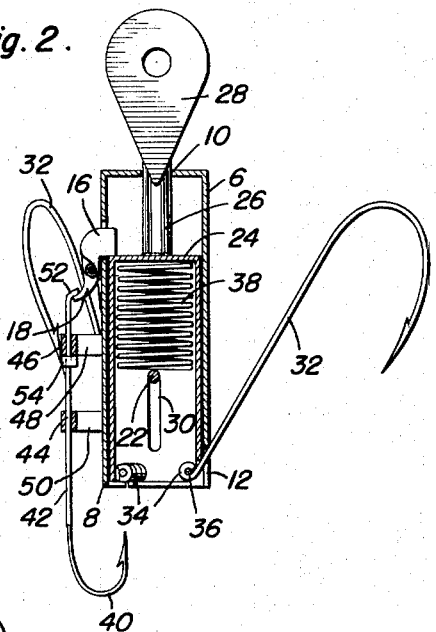
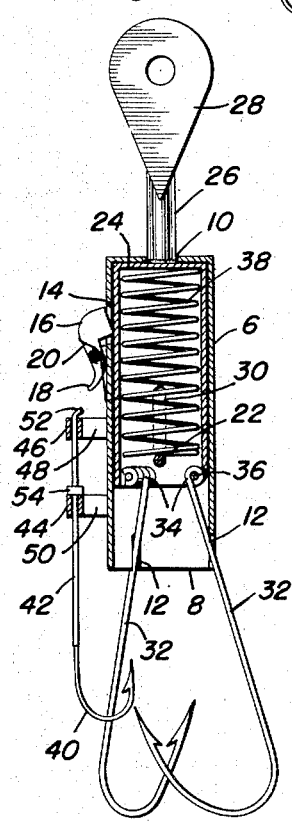
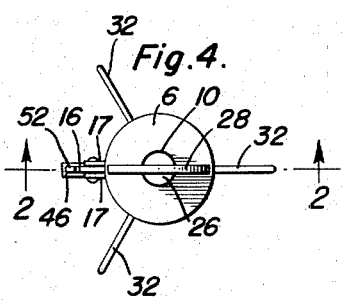
Mildred Ann Nolan
INVENTOR.

Patented Nov. 28, 1950

2,532,186

UNITED STATES PATENT OFFICE 2,532,186

FISH TRAP WITH EXPANDIBLE HOOKS

Mildred Ann Nolan, Coral Gables, Fla.

Application October 24, 1949, Serial No. 123,140

4 Claims. (Cl. 43—89)

The present invention relates to the broad class of fishing and trapping and has more particular reference to that category which has to do with so-called trap hooks having a plurality of expandible impaling hooks and pull means for tripping and rendering said hooks operable.

As the opening statement of the invention implies, there are many and varied styles and forms of expandible and contractible trap hooks. Nevertheless, and notwithstanding, the still existing problem in this field of endeavor remains unsolved. Therefore, it is an object here to bring into being a trap hook construction which is calculated to aptly meet the needs and requirements of manufacturers and users.

In reducing to practice a preferred embodiment of the invention, I have evolved and produced a selection and coordination of structural adaptations which combine in providing a fish trap in which users will find their needs and expectations fully met, contained and conveniently available.

Briefly summarized, a preferred embodiment of the invention has to do with an outer cylinder, an inner cylinder slidable within the confines of the outer cylinder and having coiled spring means associated therewith, spring opened and retained expandible hooks mounted on and carried by the inner cylinder, a spring held latch on the outer cylinder for setting and holding the inner cylinder in readiness for activity, and a baited pull actuated hook for tripping said latch.

Novelty is predicated on the stated inner and outer cylinders and particularly, on the pivoted spring held expandible hooks and notches in the outer cylinder with which the shank portions of the hooks have fulcruming action in a manner to be hereinafter described.

Then, too, structural and functional novelty is thought to reside in the specific construction of the pull actuated bait hook, manner in which it is mounted and way in which it has trippable coaction with the spring returned and held latch.

Objects and advantages in addition to the above will, it is believed, become more readily apparent from the following description and the accompanying illustrative drawings.

In the accompanying sheet of drawings wherein like numerals are employed to designate like parts throughout the views:

Fig. 1 is a perspective view of a trap hook construction devised in accordance with the principles of the present invention;

Fig. 2 is a view with parts in elevation and section showing their construction and relationship at the time the trap is set and ready to be sprung by the victim, the section being on the plane of the line 2—2 in Fig. 4;

Fig. 3 is a sectional and elevational view based on Figs. 1 and 2 and showing primarily the relationship of parts at the time the trap is sprung; and, Fig. 4 is a top plan view of the structure seen in Fig. 2.

The aforementioned outer cylinder is denoted by the numeral 6 and is substantially open at what may be designated as the lower end 8 and closed at the opposite end except for a stem accommodating and guide hole 10. The open end or skirt portion of the cylinder is provided with circumferentially spaced notches 12 which serve a purpose to be later described. Then, too, the upper wall portion of the cylinder has a slot 14 to accommodate the detent end 16 of a latch or dog, the latter being pivoted between outstanding ears 17 provided on the exterior of the cylinder. The latch, as best shown in Figs. 1, 2 and 3 has a curved tail-end 18 which constitutes what may be conveniently referred to as a trippable trigger. The numeral 20 designates spring means which is suitably mounted and associated with the latch for normally projecting the detent thereof through the opening 14 as brought out in Fig. 2. In addition, a component part of the cylinder takes the form of a cross-pin 22.

The inner cylinder 24 fits telescopically and slidably within the confines of the outer cylinder and said inner cylinder has its upper closed end provided with a stem or stud 26 projecting through and beyond the opening or hole 10 in the outer cylinder and terminating in a flat head or eye 28 to which the fishing line (not shown) is, in practice connected. The inner cylinder is adapted to shift back and forth in the outer one as shown in Figs. 2 and 3. In fact, the wall of the inner cylinder has diametrically opposite slots 30 which slide on the keying cross-pin 22. The expandible impaling hooks are carried by the inner cylinder and said hooks (there being at least three) are denoted by the numerals 32. The shank portions carry coiled springs 34 which are hingedly mounted in the skirt portion of the inner cylinder as at 36. The tendency or tension of the springs is to swing the impaling or trap hooks upwardly and outwardly to the open or expanded positions shown in Figs. 2 and 4. The spring hinged shank portions of said hooks are arranged to operate in the stated fulcruming notches 12. The main trap spring is denoted by the numeral 38 and is a suitably tensioned coil spring and this is confined in the inner cylinder and bears at one end against the cross-pin 22 and at the opposite end against the closed end of the inner cylinder. In Fig. 2 the spring 38 is shown compressed or "set" and in Fig. 3 it is shown expanded, which is the position when the trap has been "sprung."

The pull actuated means comprises a bait hook 40 having a shank 42 which is polygonal in cross section and which is slidable, but not turnable in guides 44 and 46 mounted on the exterior of the outer cylinder 6. The guides have leg portions 48 and 50 whereby they may be conveniently fixed to said outer cylinder. One end of the shank is formed into a hook 52 and the hook constitutes a trip and is releasably engageable with the aforementioned trigger 18. The sliding stroke of the shank 42 in the stated guides is limited by a suitable shoulder or stop element 54 mounted on said shank and shiftable back and forth between the two guides 44 and 46.

It will be evident that when the inner cylinder is in the "out" position shown in Fig. 2 and the spring is compressed, the latch or dog 16 will engage with said inner cylinder, the trigger 18 will move out and the trip 52 may then be engaged with the trigger as shown in Fig. 2. It will also be clear from Fig. 2 that when the trap is set, the respective impaling or trapping hooks 32 under action of the outswinging springs 34 swing outwardly to open or expanded positions. Assuming that the trip hook 40 has been suitably baited, it will be obvious that when the expected relative pull is exerted on the bait carried by said hook, the trip 52 will serve to depress the trigger 18 and this will release the latch 16 against the tension of spring 20. Spring 38, being then free, will expand and force the inner cylinder 24 into the outer cylinder 6 as shown in Figure 3. As the pivoted ends of the shanks of the impaling hooks ride into cylinder 6 and the shanks rock and cam against the crotch portions of the notches 12, it is obvious that said hooks 32 will be rocked into contracted or grappling positions. Consequently, the victim will be securely snared by and held in the spring actuated trap hooks.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice if desired.

Having described the invention, what is claimed as new is:

1. A trap hook construction of the class described, comprising an outer cylinder, an inner cylinder telescopically slidable in said outer cylinder, means between the two cylinders to prevent relative rotation of same, a spring held and turned latch pivotally mounted on said outer cylinder and releasably engageable with the inner cylinder, a pull actuated bait hook slidably mounted on said outer cylinder and having trip means releasably engageable with said latch, and snaring hooks pivotally mounted on and carried by said inner cylinder, line attaching means carried by said inner cylinder, and a coiled spring in said inner cylinder for moving the latter in a predetermined manner and direction in respect to the outer cylinder.

2. A trap hook construction of the class shown and described, comprising an outer cylinder, an inner cylinder fitted telescopically for longitudinal reciprocation in said outer cylinder, said inner cylinder being provided with diametrically opposite elongated slots, a keying and assembling pin rigidly mounted in said outer cylinder and extending through the inner cylinder by way of said slots, a stem fixedly connected to one end of said inner cylinder, said outer cylinder having a guide opening, said stem being slidable through said guide opening and terminating in an apertured ear for attachment of a fishing line, a coiled spring mounted in said inner cylinder and bearing at one end against the inner cylinder and at its opposite end against said keying pin, said outer cylinder being provided with notches, a plurality of fish snaring hooks having shanks hingedly attached to said inner cylinder, and spring means for normally swinging said hooks to expanded positions, the shanks being registered with and partly operable in said notches.

3. A trap hook construction of the class shown and described, comprising an outer cylinder, an inner cylinder fitted telescopically for longitudinal reciprocation in said outer cylinder, said inner cylinder being provided with diametrically opposite elongated slots, a keying and assembling pin rigidly mounted in said outer cylinder and extending through the inner cylinder by way of said slots, a stem fixedly connected to one end of said inner cylinder, said outer cylinder having a guide opening, said stem being slidable through said guide opening and terminating in an apertured ear for attachment of a fishing line, a coiled spring mounted in said inner cylinder and bearing at one end against the inner cylinder and at its opposite end against said keying pin, said outer cylinder being provided with notches, a plurality of fish snaring hooks having shanks hingedly attached to said inner cylinder, spring means for normally swinging said hooks to expanded positions, the shanks being registered with and partly operable in said notches, and a latch pivotally mounted on said outer cylinder, the latter having an opening, said latch including a detent operating through said opening and being releasably engageable with an end portion of the inner cylinder, said latch also having a trigger and spring means for normally engaging the detent with said inner cylinder.

4. A trap hook construction of the class shown and described, comprising an outer cylinder, an inner cylinder fitted telescopically for longitudinal reciprocation in said outer cylinder, said inner cylinder being provided with diametrically opposite elongated slots, a keying and assembling pin rigidly mounted in said outer cylinder and extending through the inner cylinder by way of said slots, a stem fixedly connected to one end of said inner cylinder, said outer cylinder having a guide opening, said stem being slidable through said guide opening and terminating in an apertured ear for attachment of a fishing line, a coiled spring mounted in said inner cylinder and bearing at one end against the inner cylinder and at its opposite end against said keying pin, said outer cylinder being provided with notches, a plurality of fish snaring hooks having shanks hingedly attached to said inner cylinder, spring means for normally swinging said hooks to expanded positions, the shanks being registered with and partly operable in said notches, a latch pivotally mounted on said outer cylinder, the latter having an opening, said latch including a detent operating through said opening and being releasably engageable with an end portion of the inner cylinder, said latch also having a trigger and spring means for normally engaging the detent with said inner cylinder, and a bait hook slidably mounted on said outer cylinder and having a trip releasably engageable with said trigger.

MILDRED ANN NOLAN.

REFERENCES CITED

The following references are of record in the file of this patent:

UNITED STATES PATENTS

| Number | Name | Date |
|---|---|---|
| 59,844 | King | Nov. 20, 1866 |
| 1,072,672 | Sweet | Sept. 9, 1913 |
| 1,238,159 | Lopisich | Aug. 28, 1917 |
| 1,734,612 | Coleman | Nov. 5, 1929 |